United States Patent
Andrenko et al.

(10) Patent No.: US 7,773,045 B2
(45) Date of Patent: Aug. 10, 2010

(54) ANTENNA AND RFID TAG

(75) Inventors: Andrey Andrenko, Kawasaki (JP); Toru Maniwa, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 11/898,425

(22) Filed: Sep. 12, 2007

(65) Prior Publication Data
US 2008/0012773 A1  Jan. 17, 2008

Related U.S. Application Data

(63) Continuation of application No. PCT/JP2005/004549, filed on Mar. 15, 2005.

(51) Int. Cl.
*H01Q 9/26* (2006.01)
(52) U.S. Cl. .................................................... 343/803
(58) Field of Classification Search .............. 343/702, 343/741–742, 803–806, 792.5; 340/792.5
See application file for complete search history.

(56) References Cited

U.S. PATENT DOCUMENTS

| | | | |
|---|---|---|---|
| 3,716,861 A | 2/1973 | Root | |
| 6,104,349 A | 8/2000 | Cohen | |
| 6,450,246 B1 | 9/2002 | Kurokawa et al. | |
| 6,452,553 B1 * | 9/2002 | Cohen | 343/702 |
| 6,603,440 B2 | 8/2003 | Howard | |
| 6,642,898 B2 * | 11/2003 | Eason | 343/770 |
| 6,784,844 B1 | 8/2004 | Boakes | |
| 6,853,347 B2 | 2/2005 | Forster et al. | |
| 6,975,277 B2 * | 12/2005 | Tran | 343/792.5 |
| 6,985,122 B2 * | 1/2006 | Cohen | 343/793 |
| 7,057,559 B2 * | 6/2006 | Werner et al. | 343/700 MS |
| 7,123,208 B2 * | 10/2006 | Puente Baliarda et al. | 343/800 |
| 7,245,196 B1 * | 7/2007 | Baliarda et al. | 333/219 |
| 7,312,762 B2 * | 12/2007 | Puente Ballarda et al. | 343/752 |
| 7,345,642 B2 * | 3/2008 | Cohen | 343/793 |
| 2002/0113739 A1 | 8/2002 | Howard | |
| 2003/0132893 A1 | 7/2003 | Forster | |
| 2003/0210188 A1 | 11/2003 | Hebron et al. | |
| 2005/0024287 A1 | 2/2005 | Jo et al. | |
| 2005/0195112 A1 | 9/2005 | Baliarda et al. | |
| 2005/0231427 A1 | 10/2005 | Puente Baliarda et al. | |
| 2005/0264453 A1 | 12/2005 | Baliarda et al. | |
| 2007/0152886 A1 | 7/2007 | Baliarda et al. | |

FOREIGN PATENT DOCUMENTS

| EP | 1058340 | 12/2000 |
|---|---|---|
| JP | 60-95711 U | 6/1985 |
| JP | 2000-349526 | 12/2000 |

(Continued)

OTHER PUBLICATIONS

"Korean Office Action (1st)", [Partial English Translation] Korean Appln No. 10-2007-7019359.

(Continued)

*Primary Examiner*—Huedung Mancuso
(74) *Attorney, Agent, or Firm*—Fujitsu Patent Center

(57) ABSTRACT

An antenna line is configured with a conductor line that meanders in a shape where a plurality of lines of the same shape, which are bent only at an obtuse angle, are provided in sequence.

9 Claims, 13 Drawing Sheets

FOREIGN PATENT DOCUMENTS

| | | |
|---|---|---|
| JP | 2001-144523 A | 5/2001 |
| JP | 2001-284935 | 10/2001 |
| JP | 2003-521146 | 7/2003 |
| JP | 2003-271912 A | 9/2003 |
| JP | 2004-88292 A | 3/2004 |
| JP | 2004-112044 | 4/2004 |
| JP | 2006-514462 A | 4/2006 |
| WO | WO-00/77884 | 12/2000 |
| WO | WO 2004-025781 | 3/2004 |

OTHER PUBLICATIONS

"Supplementary European Search Report", European Appln. No. 05720805.0.

Krischke, Alois "Rothammels's Antennenbuch, passage [ISBN: 978-3-88692-033-4]",*Rothammels Antennenbuch, Darc Verlag, Baunatalp.* 129, right column, L.19-27; p. 130, left column, L. 1-5; Fig. 6.2.9 Jan. 1, 2001, p. 129-130 [Partial English Translation].

Japanese Office Action, mailed Apr. 7, 2009, by the Japanese Patent Office in connection with corresponding JP application No. 2007507974.

CQ Ham Radio, Editorial Department "8. Matching of a Feeder and an Antenna", *Antenna Handbook, Japan, CQ Publishing Co. Ltd., Jul. 31, 1983, 29th Edition* p. 313, Left column, L.27 through p. 314, Right column, L.14 Jul. 31, 1983, p. 313-314.

European Office Action for European Appln. No. 05 720 805.0 issued on Sep. 25, 2009.

JPO—Japan Patent Office; Office Action mailed Apr. 27, 2010, in connection with corresponding Japanese patent application No. 2007-507974. English-translation provided.

\* cited by examiner

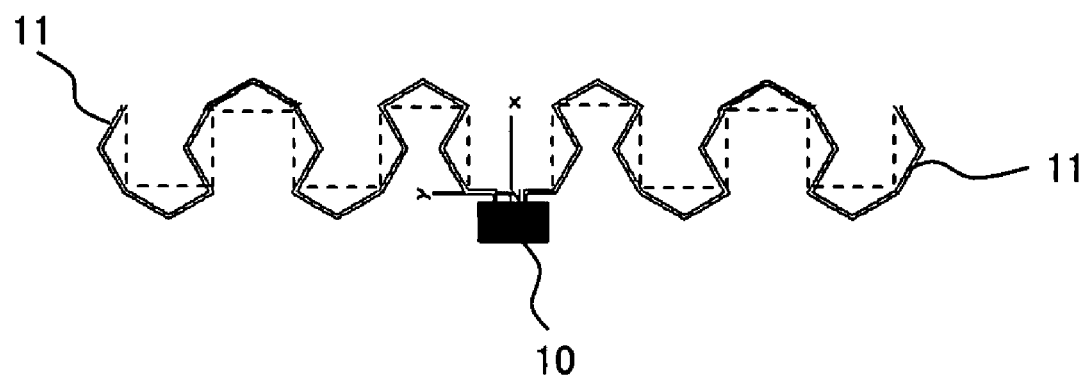
F I G. 8

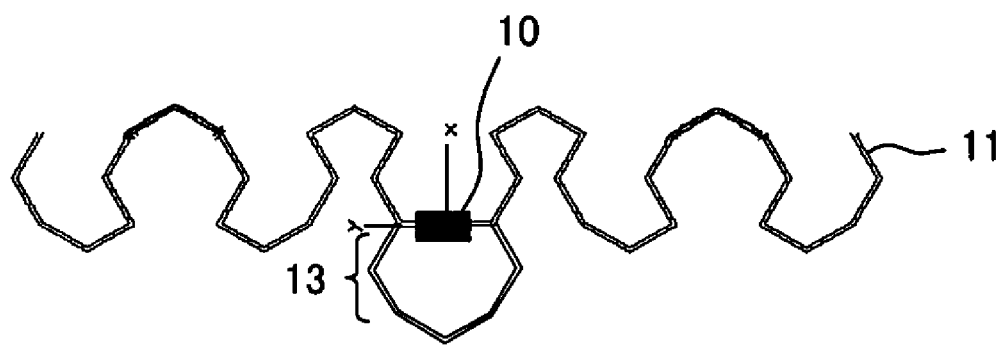
F I G. 1 3

US 7,773,045 B2

ANTENNA AND RFID TAG

CROSS REFERENCE TO RELATED APPLICATION

This application is a continuation application of international PCT application No. PCT/JP2005/004549 filed on Mar. 15, 2005.

BACKGROUND OF THE INVENTION

1. Field of the Invention

The present invention relates to an antenna technique, and more particularly, to a technique for downsizing an antenna.

2. Description of the Related Art

An RFID (Radio Frequency Identification) technique is a technique for identifying a data carrier by using a radio wave without contact. With this technique, a tag (RFID tag) in which an IC chip and an antenna are embedded is attached to an object or a person, a device called an RFID reader/writer, and the RFID tag make a communication by using a radio wave, and the RFID reader/writer reads information stored in the IC chip (RFID tag IC), whereby the object or the person is identified.

FIG. 1 shows a first example of an antenna available to an RFID tag. This antenna is a fundamental dipole antenna which is formed with antenna lines 101, and the entire length of which is a ½ wavelength, and the RFID tag is configured by connecting this antenna to an RFID tag IC 10.

Additionally, FIG. 2 shows a second example of an antenna available to an RFID tag. This antenna is a fundamental loop antenna which is formed with an antenna line 102, and the entire circumference of which is 1 wavelength, and the RFID tag is configured by connecting this antenna to an RFID tag IC 10.

As described above, the RFID tag becomes very large if the fundamental antenna such as a dipole antenna, a loop antenna, etc. is used unchanged. Therefore, the downsizing of the antenna is demanded for the RFID tag.

A number of techniques for downsizing an antenna are proposed conventionally.

For example, FIG. 3 shows a third example of an antenna available to an RFID tag. This antenna is downsized by bending a pair of antenna lines 101, which forms the dipole antenna according to the first example shown in FIG. 1, in a shape meandering at a right angle.

Furthermore, FIG. 4 shows a fourth example of an antenna available to an RFID tag. This antenna is downsized by bending the loop-shaped antenna line 102, which configures the loop antenna shown in FIG. 2, along a Hilbert fractal pattern.

Still further, FIG. 5 shows a fifth example of an antenna available to an RFID tag. This antenna is downsized by bending the loop-shaped antenna line 102, which configures the loop antenna shown in FIG. 2, along a Koch fractal pattern. The fractal means that a portion of a graphic is self-similar to the entire graphic, for example, as shown in FIG. 6A depicting the partial view of a pattern of FIG. 5, and FIG. 6B depicting the outline of the pattern. Namely, a straight line portion of a large shape is replaced with a shape similar to the entire shape as in a relationship of replacing a pattern 102a with a pattern 102b, and a relationship of replacing the pattern 102b with a pattern 102c in FIG. 6B. Therefore, a longer path length can be obtained by implementing the shape of the antenna line 102 to be a fractal pattern.

As described above, the technique using a conductor line, which is made to meander, as an antenna element is conventionally carried out.

For example, Patent Document 1 discloses a technique for forming a loop antenna by arranging 2 coils upright on a ground conductor, and by connecting the 2 coils with a meandering line or plate conductor.

Patent Document 1: Japanese Unexamined Published Patent Application No. 2001-284935

Additionally, for example, Patent Document 2 discloses a technique for arranging and bending a pair of zigzag antenna elements, which configures a dipole antenna, along the inner wall surface of a housing.

Patent Document 2: Japanese Unexamined Published Patent Application No. 2000-349526

Furthermore, for example, Patent Document 3 discloses, for example, as shown in FIG. 7, a loop antenna the line conductor of which is bent in the shape of a snowflake.

Patent Document 3: U.S. Pat. No. 6,603,440

An antenna comprised by an RFID tag is not only demanded to be small as described above, but also desired to reduce an antenna gain in order to obtain a long communication distance. Additionally, for an RFID tag, so-called a passive tag, which does not comprise a battery within the RFID tag itself, and uses a radio wave from an RFID reader/writer as a power source for its operations, an antenna having high impedance is demanded to obtain a high power source voltage.

However, if the antenna is downsized by making a conductor line, which is an antenna element, simply meander, degradations in a gain and impedance are caused in contradiction to the above described demands.

SUMMARY OF THE INVENTION

The present invention was developed in the light of the above described problems, and an object thereof is to prevent a gain from being degraded even if an antenna is downsized by making a conductor line, which is an antenna element, meander.

An antenna according to one preferred embodiment of the present invention is characterized in that an antenna element is configured with a conductor line which meanders in a shape where a plurality of lines of the same shape, which are bent only at an obtuse angle, are provided in sequence, and solves the above described problems with this characteristic.

With the above described configuration, the number of portions, which are bent at a right angle or an acute angle, of a conductor line configuring an antenna element decreases, whereby a loss in the energy of a high-frequency signal is reduced, and the emission efficiency of the antenna is improved as a result.

In the above described antenna according to the present invention, the antenna element may configure a dipole antenna.

Additionally, in the above described antenna according to the present invention, the antenna element may configure a loop antenna, the maximum point of an electric current in the antenna element when a high-frequency signal is fed may be arranged closer to the feeding point of the antenna element than the voltage maximum point of the antenna element at the time of the feeding.

With this configuration, a line in the vicinity of the feeding point and that in the vicinity of the maximum point of the electric current are linked stronger, so that the impedance of the antenna can be made high.

At this time, the length of the entire circumference of the antenna element, which configures the loop antenna, may be nearly one wavelength.

Additionally, at this time, a line width at the maximum point of the electric current of the conductor line, which configures the antenna element, may be broader than that at the feeding point of the conductor line.

With this configuration, an electric current made to flow into a feeding device provided at the feeding point is more difficult to flow than in the conductor line in the vicinity of the maximum point of the electric current, so that impedance becomes high.

Furthermore, in the above described antenna according to the present invention, an induction element which cancels the capacitive component of the feeding device feeding a high-frequency signal to the antenna element may be comprised at the feeding point of the antenna element, and the induction element may be formed with a conductor line in a shape where a plurality of lines of the same shape, which are bent only at an obtuse angle, are provided in sequence.

With this configuration, an energy loss in the induction element is reduced.

Also an RFID tag, which is characterized in that the above described antenna according to the present invention is comprised, relates to the present invention.

The present invention is configured as described above, thereby producing an effect that degradation in a gain is reduced even if an antenna is downsized by making a conductor line, which is an antenna element, meander.

BRIEF DESCRIPTION OF THE DRAWINGS

FIG. 8 is a schematic showing a configuration example of an antenna implementing the present invention;

FIG. 13 is a schematic showing an example where an induction element is inserted in parallel to an RFID tag IC arranged at a feeding point in the dipole antenna shown in FIG. 8;

DESCRIPTION OF THE PREFERRED EMBODIMENTS

Preferred embodiments according to the present invention are described below with reference to the drawings.

Figure 3:
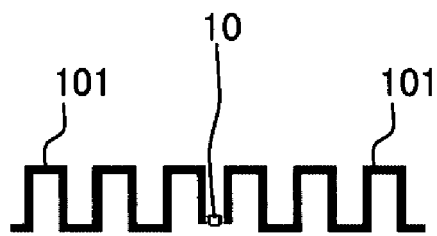
FIG. 3 is a schematic showing a third example of an antenna available to an RFID tag.

FIG. 8 shows a configuration example of an antenna implementing the present invention. This antenna is a dipole antenna that is formed with a pair of antenna lines 11, which are conductor lines, and has the entire length of a ½ wavelength, and an RFID tag is configured by connecting this antenna to an RFID tag IC 10. The shapes of the antenna elements (the pair of antenna lines 11), which form this antenna, are replaced with lines formed by bending a straight line portion of the antenna line 101, which is shown in FIG. 3 and bent at a right angle in a meandering shape, at an obtuse angle, so that the number of portions bent at a right angle (90°) or an acute angle decreases.

Normally, if a conductor line which configures an antenna element is bent at a right angle or an acute angle, the energy of a high-frequency signal to be emitted from an antenna is lost in that portion due to interference, etc., and emission efficiency as the whole of the antenna is degraded. Here, if the antenna line 11 is replaced with the conductor line which is shown in FIG. 8 and bent at an obtuse angle, the number of portions, which are bent at a right angle or an acute angle, of the conductor line configuring the antenna element decreases, whereby the loss of the energy of a high-frequency signal is reduced, and the emission efficiency of the antenna is improved as a result.

Figure 4:
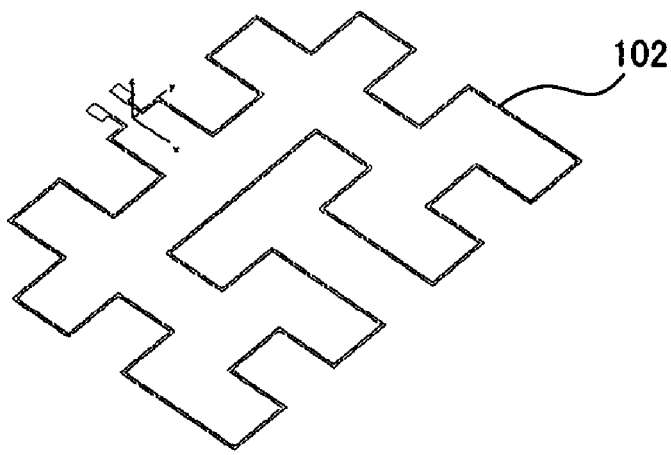
FIG. 4 is a schematic showing a fourth example of an antenna available to an RFID tag.
Figure 5:
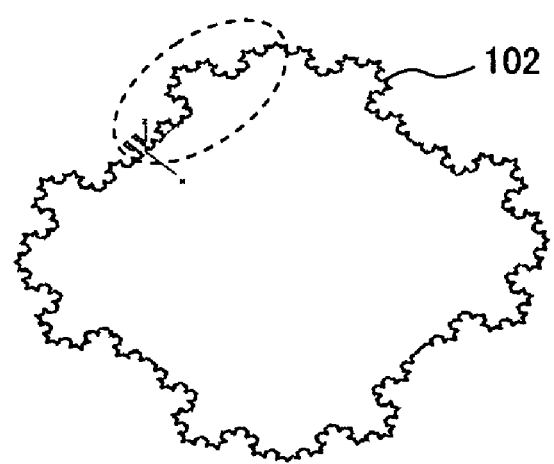
FIG. 5 is a schematic showing a fifth example of an antenna available to an RFID tag.
Figure 6A:
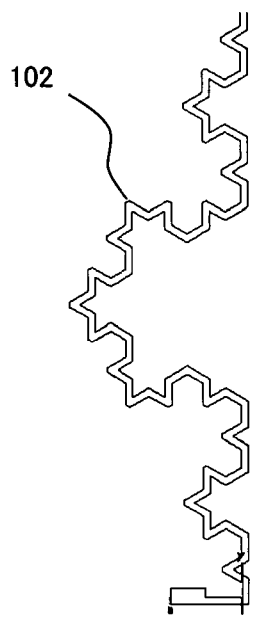
FIG. 6A is a schematic showing a portion of the antenna shown in FIG. 5.
Figure 6B:
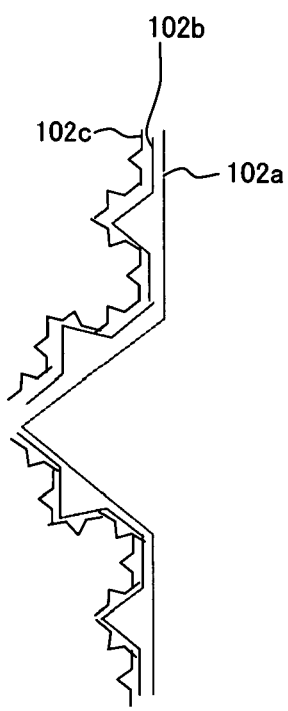
FIG. 6B is a schematic explaining a fractal pattern of FIG. 5.

In the example of FIG. 8, the dipole antenna is configured with the conductor line which meanders in a shape where a plurality of lines of the same shape, which are bent only at the obtuse angle, are provided in sequence. Alternatively, a loop antenna may be configured by replacing the straight line portions of the antenna line 102, which is bent along a fractal pattern as shown in FIGS. 4 and 5, with lines bent at an obtuse angle. The pattern of the replaced antenna line 102 is no longer fractal.

Figure 9A:
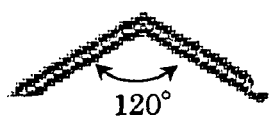
FIG. 9A is a schematic showing a first example of a bending shape of a basic line which configures an antenna.
Figure 9B:
FIG. 9B is a schematic showing a second example of a bending shape of a basic line which configures an antenna.
Figure 9C:
FIG. 9C is a schematic showing a third example of a bending shape of a basic line which configures an antenna.
Figure 9D:
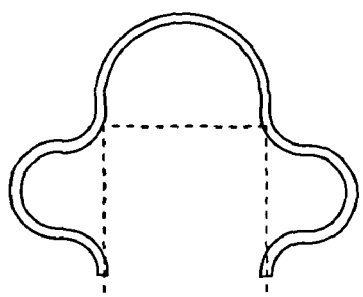
FIG. 9D is a schematic showing a fourth example of a bending shape of a basic line which configures an antenna.

Additionally, in the above described example, the line of the same shape shown in FIG. 9A, namely, the line bent only at an obtuse angle such as 120° is adopted, and the antenna element is formed with the conductor line which meanders in a shape where a plurality of lines of the same shape as the adopted line are provided in sequence. However, a curve in the shape of a semicircle exemplified in FIG. 9B, or a curve in the shape of a sinusoidal wave of 1 period exemplified in FIG. 9C may be adopted instead of adopting the line of the above described shape. Besides, a line of combined shapes, which is exemplified in FIG. 9D, such as a shape obtained by combining the semicircle of FIG. 9B and the sinusoidal wave of FIG. 9C may be adopted.

Figure 1:
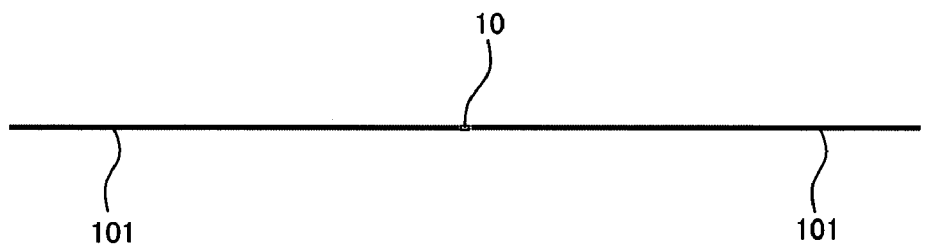
FIG. 1 is a schematic showing a first example of an antenna available to an RFID tag.
Figure 2:
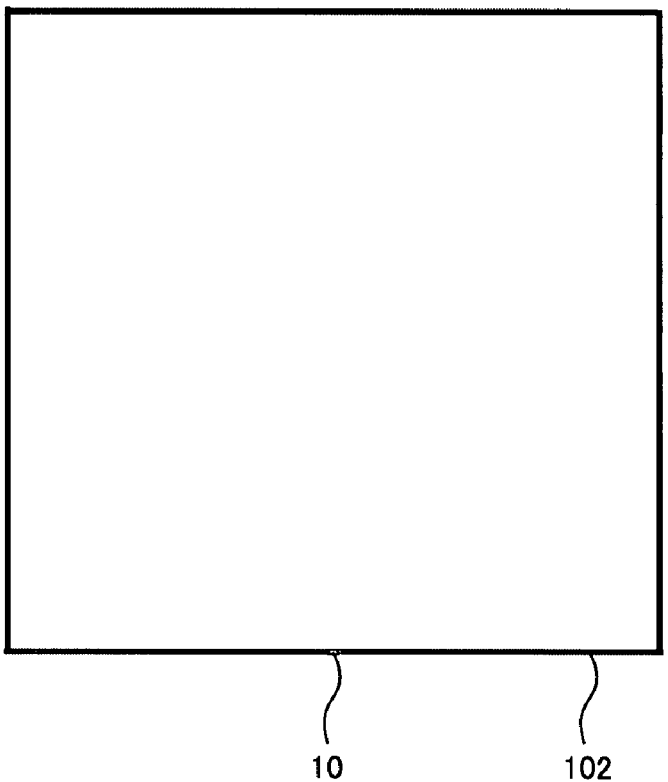
FIG. 2 is a schematic showing a second example of an antenna available to an RFID tag.
Figure 7:
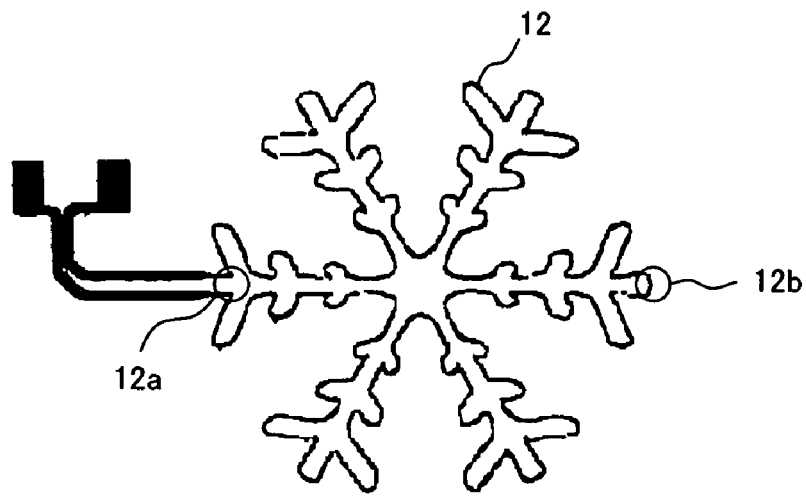
FIG. 7 is a schematic showing an example of a conventional loop antenna formed by bending a line conductor in the shape of a snowflake.

Incidentally, as described above, for an RFID tag, which is a passive tag, an antenna having high impedance is demanded to gain a high power source voltage. In this point, the 1-wavelength loop antenna shown in FIG. 2 is desirable as an RFID tag because its impedance is high (normally on the order of 300Ω). However, for the conventional loop antenna formed by bending the line conductor as exemplified in FIG. 7, a feeding point 12a at which an RFID tag is connected, and a point 12b which is the position of a ½ wavelength from the feeding point 12a are far apart in the antenna line 12. In the 1-wavelength loop antenna, a high-frequency current becomes the maximum both at the feeding point 12a and the point 12b in the antenna line 12. If these 2 points are far apart, the impedance is degraded to on the order of several tens of Ω.

Figure 10:
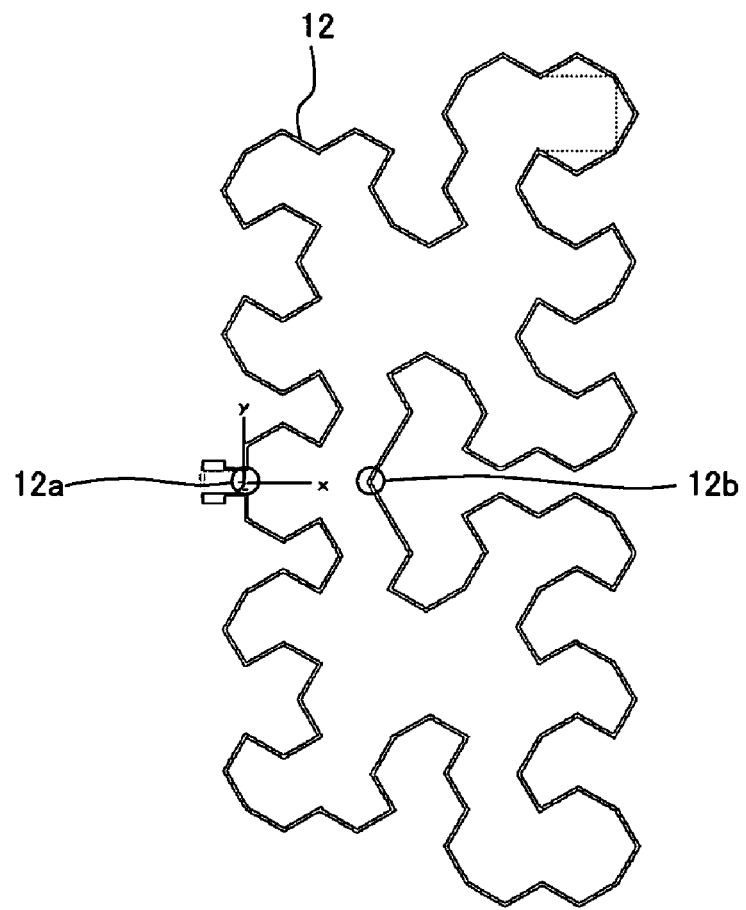
FIG. 10 is a schematic showing an example of a loop antenna configured by making a current maximum point close.

Accordingly, as shown in FIG. 10, in the antenna line 12, which is a conductor line meandering in the shape where the plurality of lines of the same shape, which are bent only at the obtuse angle, are provided in sequence, the loop antenna the entire circumference length of which is nearly 1 wavelength is configured by making the feeding point 12a and the point 12b close and arranging them, and this antenna is used for the RFID tag. In consequence, the linkage between the line in the vicinity of the feeding point 12a and that in the vicinity of the point 12b becomes strong, thereby improving the impedance.

Figure 11:
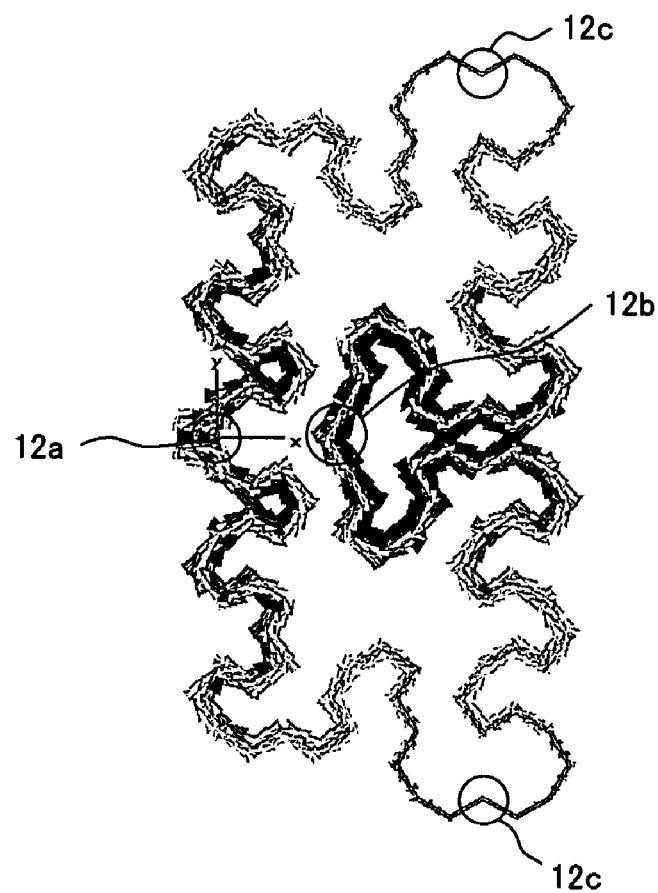
FIG. 11 is a schematic showing the results of a simulation of the current distribution of the loop antenna shown in FIG. 10.

Results of a computer simulation of the distribution of a high-frequency current when a high-frequency signal is fed to the loop antenna exemplified in FIG. 10 are shown in FIG. 11. This figure indicates that a larger current flows as the color gets dark. As is known from this figure, it is proved that the point 12b at which the high-frequency current becomes the maximum in the antenna line 12 is arranged closer to the feeding point 12a than a point 12c at which the high-frequency current becomes the minimum (namely, the point at which the high-frequency voltage becomes the maximum).

Figure 12:
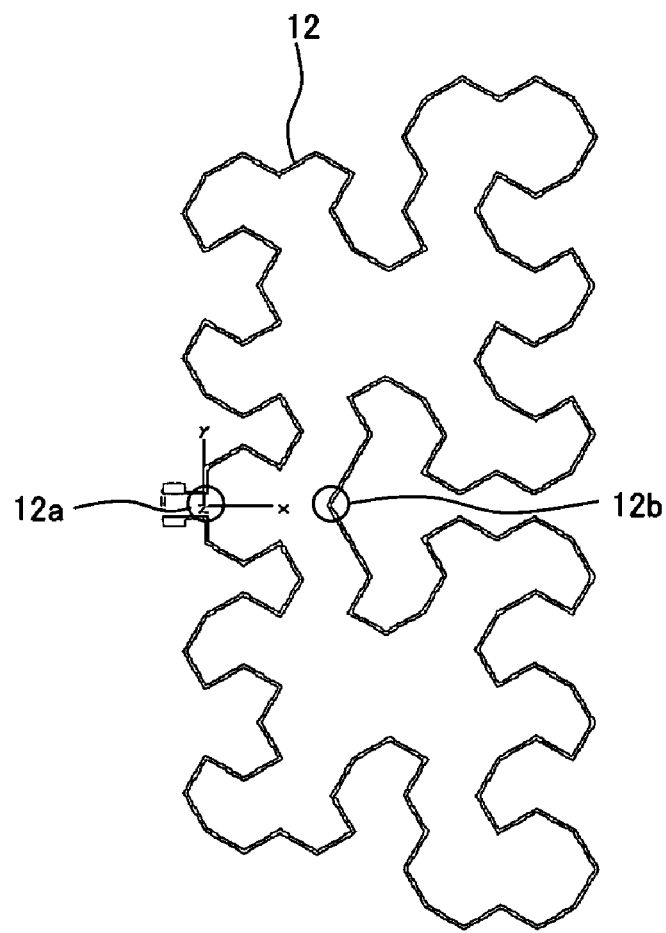
FIG. 12 is a schematic showing an example of a loop antenna where a line width in the vicinity of a current maximum point on a side opposite to a feeding point is made broad.

In the loop antenna exemplified in FIG. 10, if a line width in the vicinity of the point 12b in the antenna line 12 is made broader than that in the vicinity of the feeding point 12a as shown in FIG. 12, a current made to flow into the RFID tag IC provided at the feeding point 12a is more difficult to flow than in the antenna line 12 in the vicinity of the point 12b, so that the impedance becomes high.

Incidentally, there are cases where an induction element for canceling the internal capacity of an RFID tag IC is connected in parallel to an antenna. FIG. 13 is a schematic showing an example where such an induction element 13 is inserted in parallel to the RFID tag IC 10 arranged at the feeding point in the dipole antenna exemplified in FIG. 8. In this example, the induction element 13 is formed with a conductor line in a shape where a plurality of lines of the same shape, which are bent only at an obtuse angle, are provided in sequence similar to the antenna element 11. Accordingly, also for this induction element 13, its energy loss becomes small.

In addition, the present invention is not limited to the above described preferred embodiments, and various improvements and modifications can be made within a scope which does not deviate from the gist of the present invention.

For example, the loop antenna shown in FIGS. 10 and 12 is configured to be a line-symmetric shape, but the loop antenna may be configured to be an asymmetric shape.

What is claimed is:

1. An antenna comprising:
an antenna element configured with a conductor line that meanders in a shape where a plurality of lines of a same shape, which are bent only at an obtuse angle, are provided in sequence, wherein
the antenna element is a loop antenna, and a current maximum point of the antenna element when a high-frequency signal is fed is arranged closer to a feeding point of the antenna element than a voltage maximum point of the antenna element at the time of the feeding, and
a line width of the conductor line at the current maximum point of the antenna element is broader than a line width of the conductor line at the feeding point of the antenna element.

2. The antenna according to claim 1, wherein
a length of an entire circumference of the antenna element which forms the loop antenna is nearly 1 wavelength.

3. The antenna according to claim 1, further comprising:
an induction element to cancel a capacitive component of a feeding device feeding a high-frequency signal to the antenna element, the induction element being connected at a feeding point of the antenna element; and
the induction element is formed with a conductor line in a shape where a plurality of lines of a same shape, which are bent only at an obtuse angle, are provided in sequence.

4. An RFID tag comprising:
an antenna where an antenna element is configured with a conductor line that meanders in a shape where a plurality of lines of a same shape, which are bent only at an obtuse angle, are provided in sequence, wherein
the antenna element forms a loop antenna, and a current maximum point of the antenna element when a high-frequency signal is fed is arranged closer to a feeding point of the antenna element than a voltage maximum point of the antenna element at the time of the feeding, and
a line width of the conductor line at the current maximum point of the antenna element is broader than a line width of the conductor line at the feeding point of the antenna element.

5. An antenna for an RFID tag comprising:
an antenna element including a conductor with adjacent segments of the conductor being arranged at only obtuse angles, wherein
the antenna element is a loop antenna, and a current maximum point of the antenna element when a high-frequency signal is fed is arranged closer to a feeding point of the antenna element than a voltage maximum point of the antenna element at the time of the feeding, and
a width of the antenna element at the maximum point of current is larger than a width at the feeding point of the antenna element.

6. The antenna according to claim 5, wherein the conductor has a first width at a feeding point of the conductor and a second width that is larger at a location away from the feeding point of the conductor.

7. The antenna according to claim 5, wherein the conductor has a first cross-sectional area at a feeding point of the conductor and a second cross-sectional area that is larger at a location away from the feeding point of the conductor.

8. The antenna according to claim 5, wherein a length of the antenna element is nearly 1 wavelength.

9. The antenna according to claim 8, further comprising:
an induction element to reduce a capacitive component of a feeding device feeding a high-frequency signal to the antenna element, the induction element being connected at a feeding point of the antenna element; and
the induction element includes a conductor with adjacent segments of the conductor only being arranged at obtuse angles.

* * * * *